(12) United States Patent
Scott et al.

(10) Patent No.: US 7,410,335 B2
(45) Date of Patent: Aug. 12, 2008

(54) CARGO STABILIZING STRUCTURES

(75) Inventors: Gary M. Scott, Milwaukie, OR (US); Roland R. Boehrer, Wilsonville, OR (US)

(73) Assignee: Burns Bros., Inc., Lake Oswego, OR (US)

(*) Notice: Subject to any disclaimer, the term of this patent is extended or adjusted under 35 U.S.C. 154(b) by 15 days.

(21) Appl. No.: 11/218,985

(22) Filed: Sep. 2, 2005

(65) Prior Publication Data

US 2006/0051178 A1   Mar. 9, 2006

Related U.S. Application Data

(60) Provisional application No. 60/607,560, filed on Sep. 7, 2004.

(51) Int. Cl.
*B60P 7/08* (2006.01)
(52) U.S. Cl. .................. 410/130; 410/129; 410/140; 410/143; 410/121; 410/145
(58) Field of Classification Search .............. 410/143, 410/129, 130, 140, 150, 151, 121, 145; 224/403–404; 211/105.3, 105.4; 248/354.6, 354.7, 354.3
See application file for complete search history.

(56) References Cited

U.S. PATENT DOCUMENTS

| 4,772,165 | A | * | 9/1988 | Bartkus | 410/139 |
| 5,971,685 | A | * | 10/1999 | Owens | 410/151 |
| 6,755,600 | B2 | | 6/2004 | Scott | |
| 2003/0161700 | A1 | | 8/2003 | Moore | |

FOREIGN PATENT DOCUMENTS

| DE | 200 16 200 U1 | 1/2001 |
| EP | 1 108 609 A1 | 6/2001 |

* cited by examiner

*Primary Examiner*—Stephen Gordon
(74) *Attorney, Agent, or Firm*—Schwabe, Williamson & Wyatt, P.C.

(57) ABSTRACT

Stabilizing devices having elongate telescoping tube segments and end clamps. The end clamps of certain of the devices are clamped onto side rails of a cargo bed for segmenting a cargo bed length way. The end clamps of other of the devices are clamped to the tube segments of the first devices for segmenting a cargo bed width way. Thus providing stabilization of segmented loads having length and/or width dimensions less than the length and/or width of the cargo bed.

18 Claims, 6 Drawing Sheets

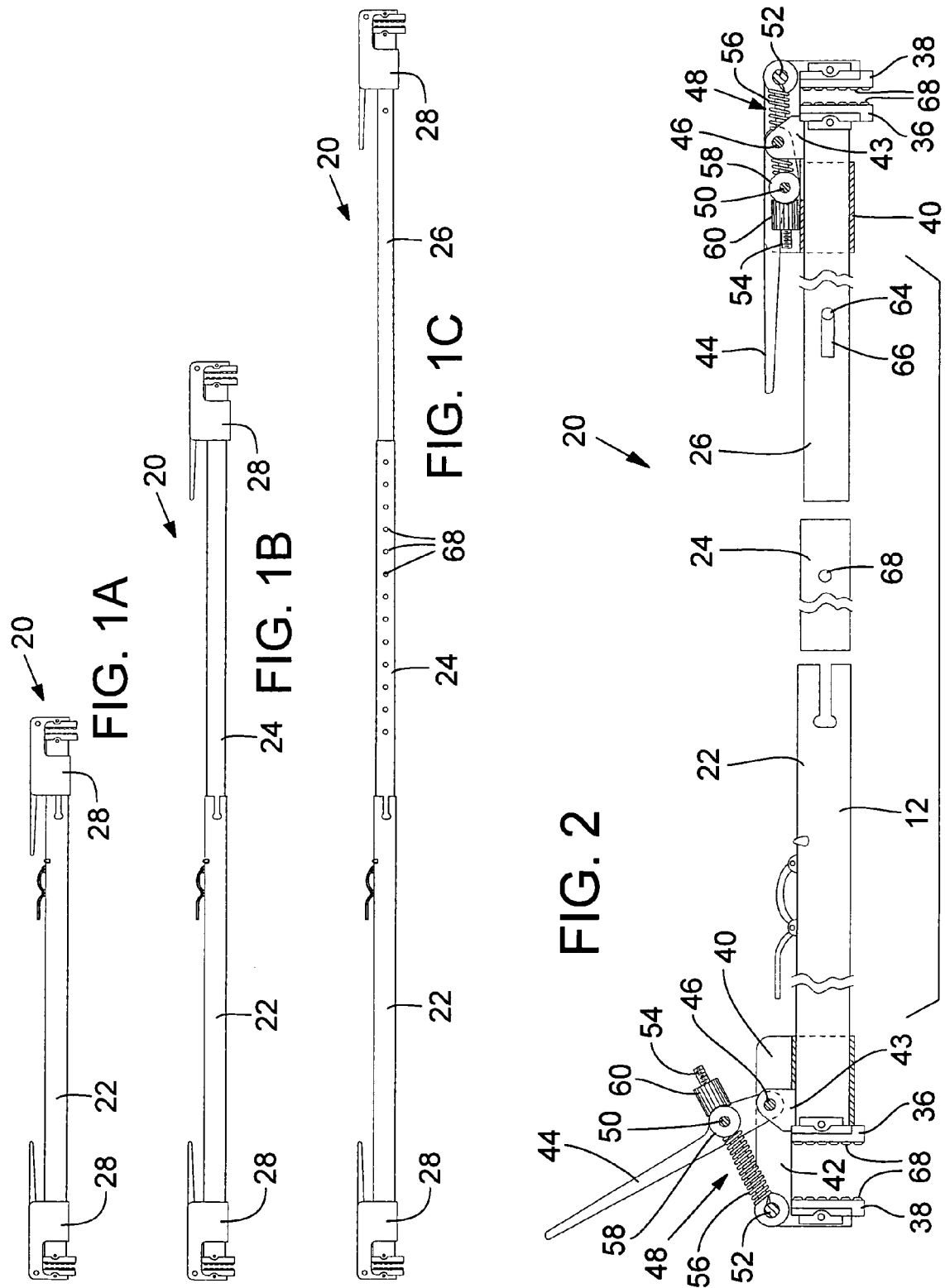

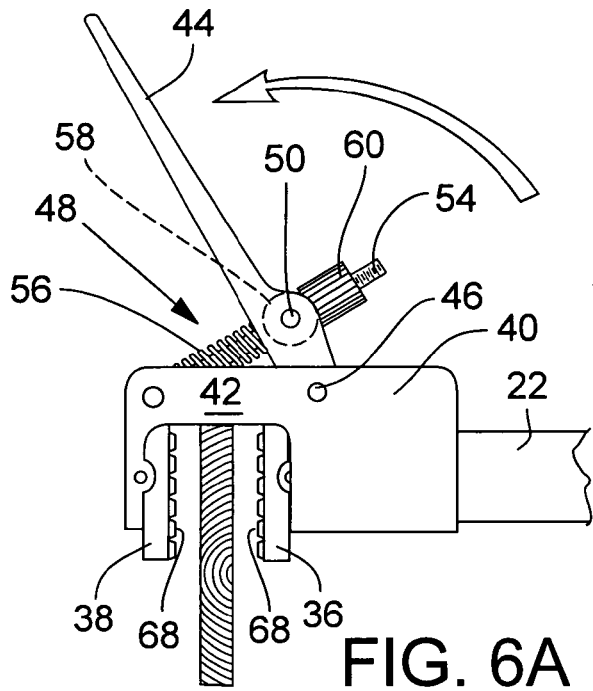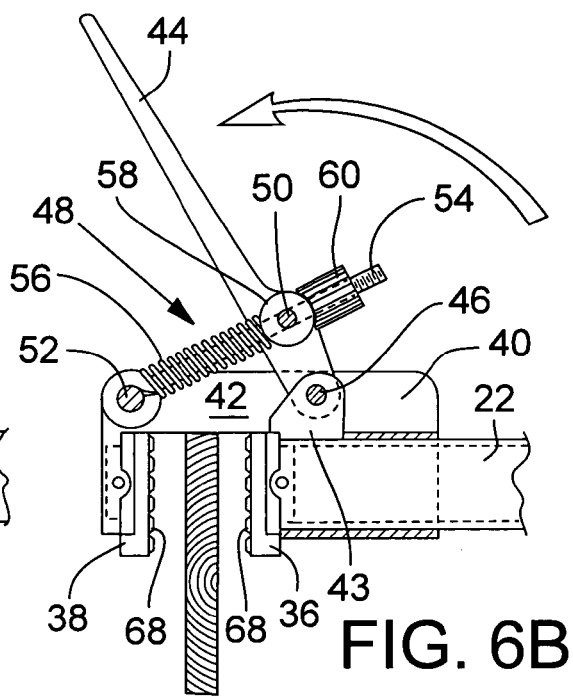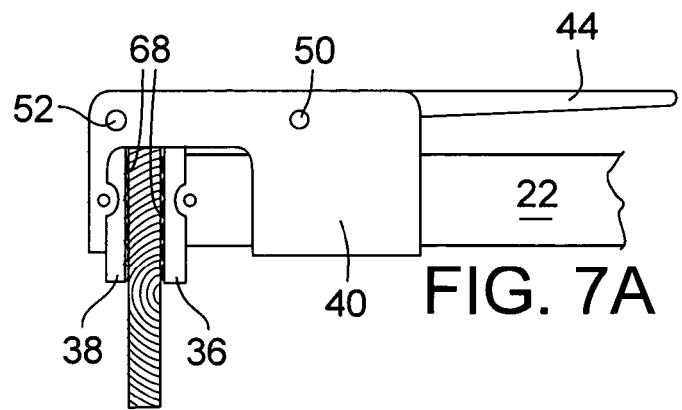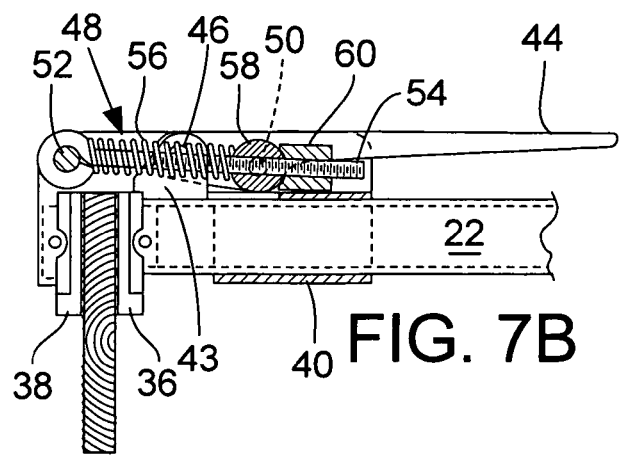

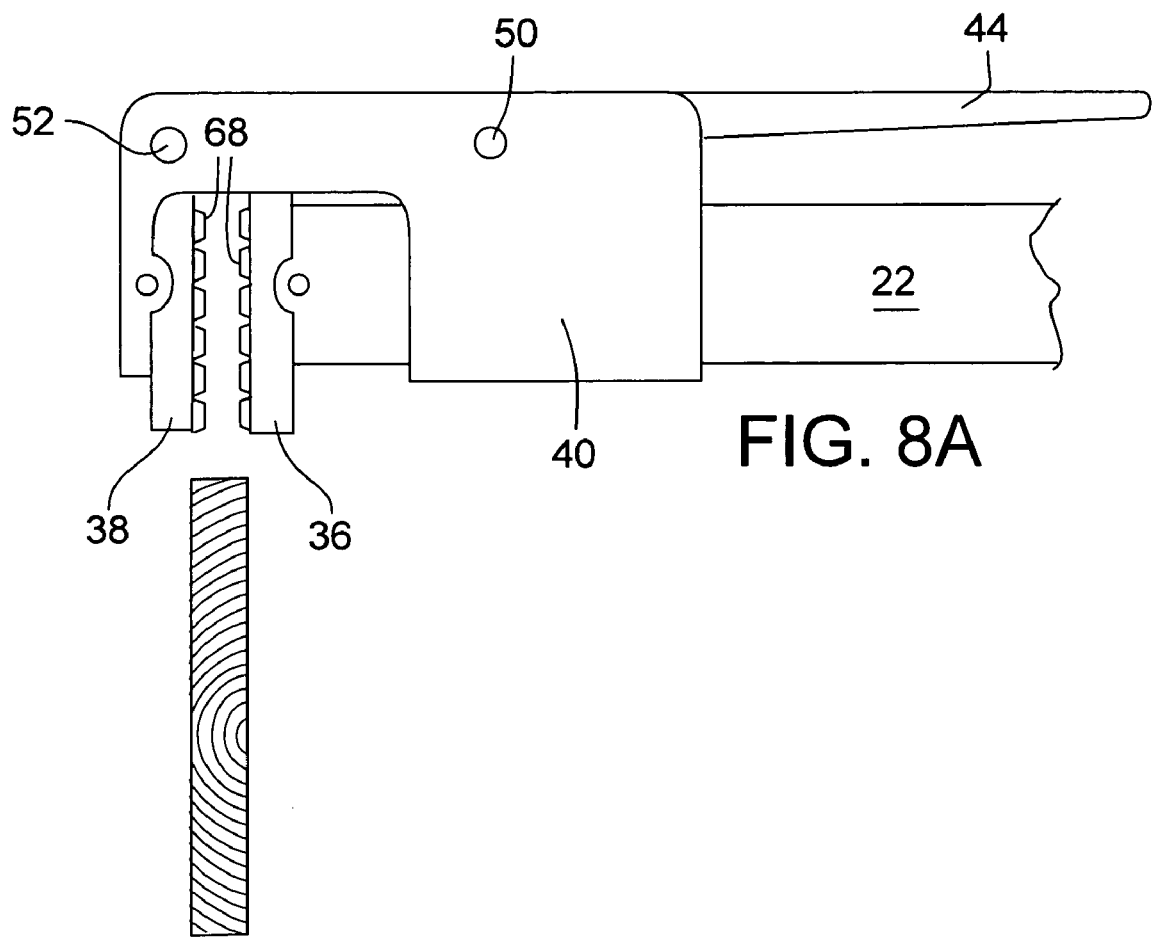
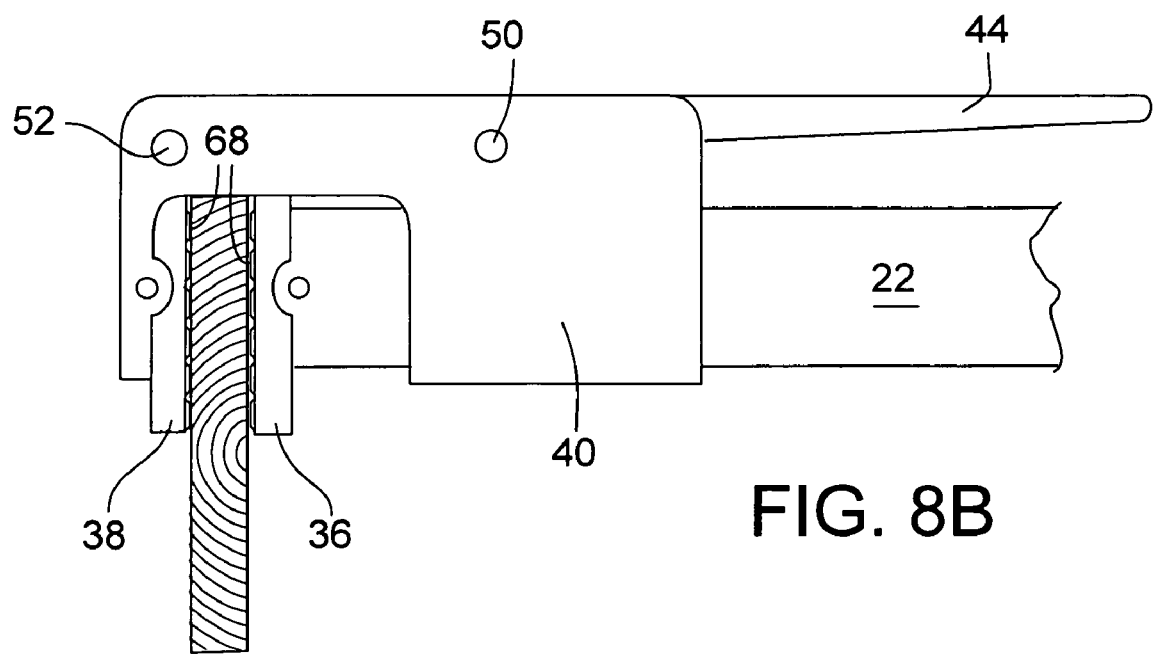

CARGO STABILIZING STRUCTURES

RELATED APPLICATION

The present invention is a Non-Provisional Application of Provisional Application No. 60/607,560 filed Sep. 7, 2004 entitled "Cargo Stabilization Device for Vehicles and Trailers with Side Boards," claims priority to said provisional application, and incorporates its specification in its entirety by reference.

FIELD OF THE INVENTION

This invention relates to structures for stabilizing individual segments of a cargo e.g., being delivered to different delivery sites.

BACKGROUND OF THE INVENTION

A type of cargo delivery utilizes a truck bed on which different segments of cargo are to be delivered to different sites. The truck bed may include e.g., a flat bed truck provided with side rails that contain the cargo on the truck bed. A removable fabric cover (soft side) may be draped over the sides and raised to allow side removal of the load segments.

A problem occurs when the segments are sequentially unloaded. For example, a first delivery stop may involve the removal of a cargo segment at the front or middle of the truck bed. When subsequently traveling to a second site, the remaining cargo may be free to slide into the space vacated by the already delivered cargo segment. This problem is solved by the provision of cargo stabilizing devices. An elongate bar has end clamps, the bar extending between the side rails of the truck bed and removably clamped to the side rails. Thus a first segment is loaded on the truck bed and a stabilizing bar or bars mounted to the side rails and immediately behind that front segment. A second segment is loaded onto the bed and further stabilizing bars are similarly mounted, etc. The first segment can be unloaded (as permitted e.g., by rollup of the soft truck bed sides) and the stabilizing bars mounted behind that segment and in front of the second segment will stabilize the remainder of the load. The segmented loads will be stabilized regardless of whether the first removed/delivered segment is a center segment, rear segment, etc.

BRIEF DESCRIPTION OF THE INVENTION

The process of stabilization as described above assumes that the cargo load is segmented in parallel lots, i.e. where each segment extends across the width of the truck bed both at the front and rear sides of the load segment. Should a load segment or portion thereof extend across the width e.g., at a ten foot depth for a part of the truck bed width and then narrowed to a five foot depth, a pocket is formed. That pocket can be filled by a following load segment but when one or the other is removed, a space is created that is not protected by a stabilizing bar, i.e. a cargo portion is free to slide sideways into the vacated pocket.

The present invention addresses this concern. The stabilizing bar is collapsible/extendable in length e.g., between a shortened length of about four feet and an extended length of about nine feet. Upon the occurrence of a "pocket", a stabilizing bar is adjusted in length to the front and back distance of the spaced apart front and back stabilizing bars, and then removably clamped to the front and back stabilizing bars to protect a load from sliding sideways. The end clamps are designed to fit the bar configuration (or vise versa, the bar configuration is designed to accommodate the end clamps).

A further improvement to the end clamps allows rapid adjustment of the clamps as may be desirable for clamping the variable widths of the side rails. The collapsible stabilizing bar further benefits in providing greater convenience in the storage of the bars.

DESCRIPTION OF THE DRAWINGS

FIGS. 1A, 1B, 1C illustrate an elongate bar having end clamps representing one embodiment of the stabilizing device of the invention in collapsed and extended views;

FIG. 2 illustrates the embodiment of FIG. 1 in partial section view;

FIGS. 3A, 3B, 4A, 4B, 5A, 5B, 6A, 6B, 7A, 7B, 8A, and 8B illustrate the end clamp for the elongate bar of FIG. 1 and its various operating components including selected variations thereof.

DETAILED DESCRIPTION

Figure 1D:
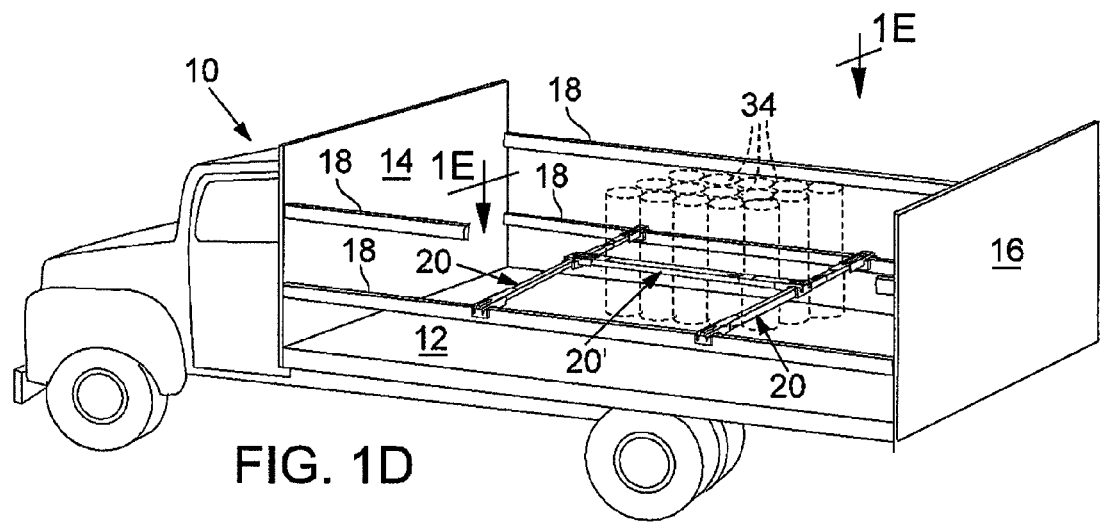
FIGS. 1D and 1E illustrate schematically the device of FIG. 1 applied to a truck bed.

Reference is first made to FIG. 1D which illustrates a truck 10 having a flat truck bed 12 and front and rear end walls 14 and 16. Extended along the sides are side rails 18. Cargo to be delivered is loaded on the truck bed 12 and confined on the truck bed by the rails 18. The side rails 18 may be of different types i.e. removable or stationary and these may be supported only at the end walls or provided with intermediate support posts. Regardless, such trucks may be used to deliver cargo load segments, the segments being delivered to different locations.

Figure 1E:
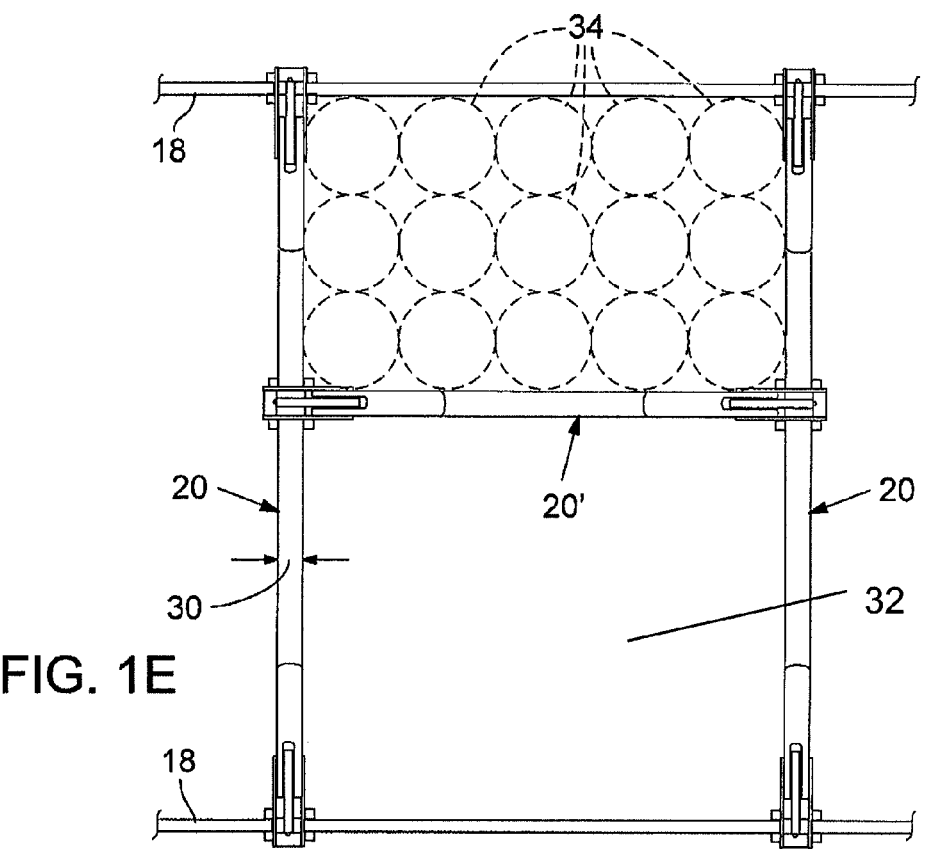

Typically loads are separated on the truck bed by stabilizing devices that are clamped at the ends to the side rails. Depicted in FIGS. 1D and 1E are the improved stabilizing devices 20 of the present invention. As shown in FIG. 1A through 1C, the stabilizing devices of the present invention are adjustable lengthwise. With particular reference to FIG. 1C and FIG. 2 it will be appreciated that the device 20 is an elongate bar in the form of square tubing and provided are three telescoping segments 22, 24 and 26. Tube segment 26 is smaller in cross section than segment 24 and slides into and out of the tube 24; and tube segment 24 is smaller in cross-section than tube 22 and slides into and out of tube 22. As an example only, the tube length may each be in the order of three and one half feet in length and collapsible down to an overall length of four feet (including end clamps 28 to be explained hereafter). The collapsibility of the tube or bar segments serves two purposes. It enables storage in a smaller space i.e. a four foot long storage area or for shipping on, e.g. four foot long pallets. Yet it is extendable to the typical truck bed width requiring a tube or bar length of between eight and nine feet. More importantly to the present invention, collapsibility, e.g. down to an overall four foot length enables the use of the stabilizing bar in the length way direction (between front and back previously placed cargo bars) to accommodate different load depths.

Reference is now made to FIGS. 1D and 1E to further illustrate this use. Stabilizing bar 20' is identified differently only in the manner for which it is utilized. That is, rather than extending side to side between the side rails 18, bar 20' extends length way between bars 20. As will be further explained, the width configuration of bars 20 (thickness 30) is similar to the thickness of the side rails 18 and end clamps 28 can similarly be clamped onto the bars 20 as illustrated.

With this enablement (collapsibility to different lengths and clamping capability to the bars 20) the bar use 20' enables support against in-pocket-sliding. That is, assume the cargo of pocket 32 has been unloaded leaving the cargo 34 adjacent pocket 32 free to slide cross ways into that pocket. As illustrated a bar 20' can be adjusted down to the length between bars 20 and butted up against cargo portion 34 and clamped onto the bars 20 to securely hold cargo 34 in place.

Reference is now made to the end clamps illustrated in FIGS. 2-8. As will be observed, the clamps include opposing jaws including an inner fixed jaw 36 and outer moveable jaw 38. A slide member 40 is slideably mounted on the bar ends behind the inner jaws 36. The outer jaw 38 is mounted to an arm portion 42 of the slide member 40 and moves toward and away from the inner jaw 36 as dictated by the sliding movement of slide member 40. A bracket 43 is fixably mounted to the tube end. A lever 44 is pivotably mounted at pivot 46 to the bracket 43. A pull rod 48 extends from pivot 52 at the end of arm 42 (overlying moveable jaw 38) to pivot 50 on lever 44, which pivot 50 is a determined distance from pivot 46.

It will be appreciated that pivotable movement of lever 44 about pivot 46 will produce back and forth movement of jaw 38. The outermost position and the innermost position of jaw 38 relative to fixed jaw 36 is dictated by the length of pull rod 48 between pivots 52 and 50. This distance is adjustable as will now be explained.

Figure 3A:
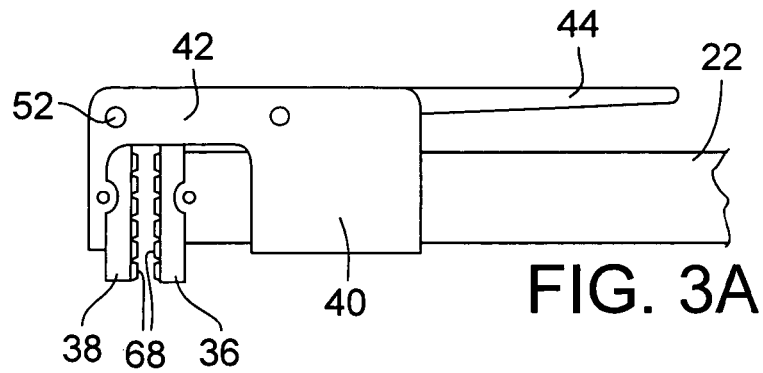
Figure 3B:
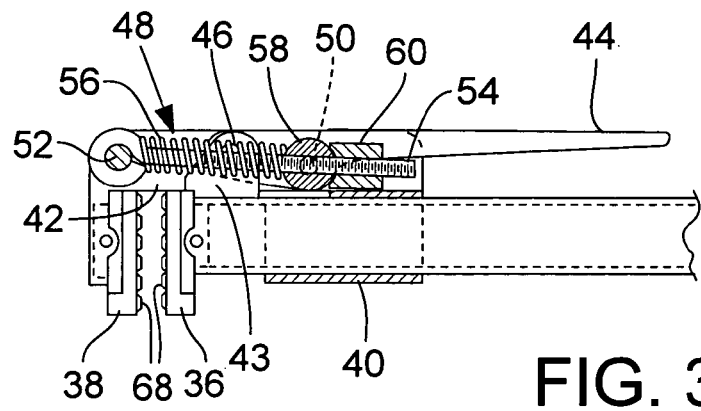
Figure 4A:
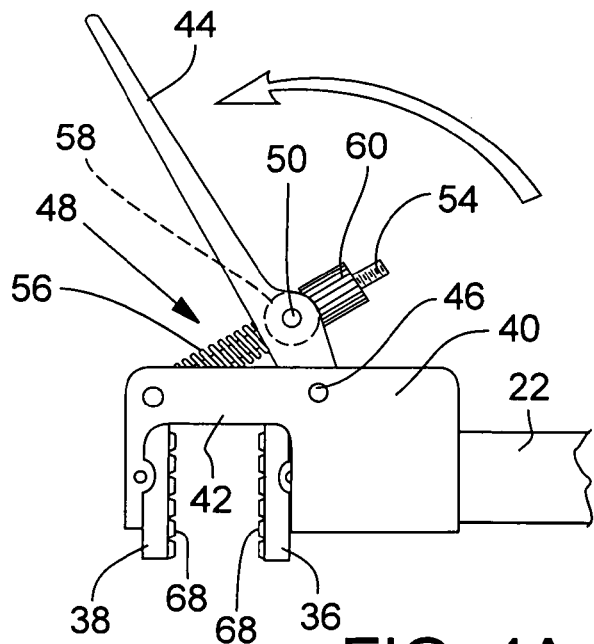
Figure 4B:
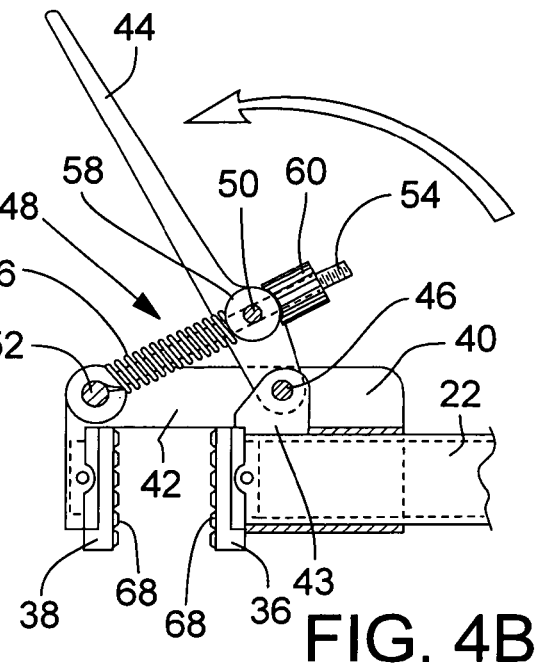

With reference to FIGS. 3 and 4, it is first pointed out that the securement of the lever 44 in a closed position i.e. FIGS. 3A and 3B, is achieved by forcing lever 44 to an over center position. That is, pivot 50 is pivoted past the line of connection between pivot 46 and pivot 52. Once lever 44 is pivoted to this position, the distance between jaws 36, 38 is firmly established. Whereas not all rails 18 have the exact same thickness, it is desirable to provide adjustment as to the distance between the jaws when closed.

Figure 5A:
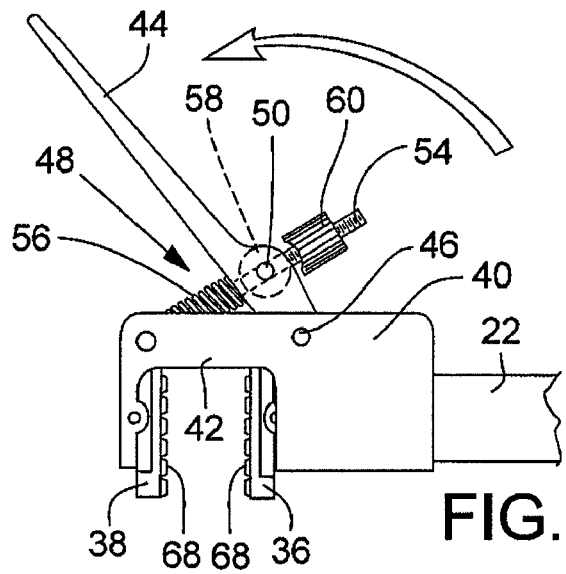
Figure 5B:
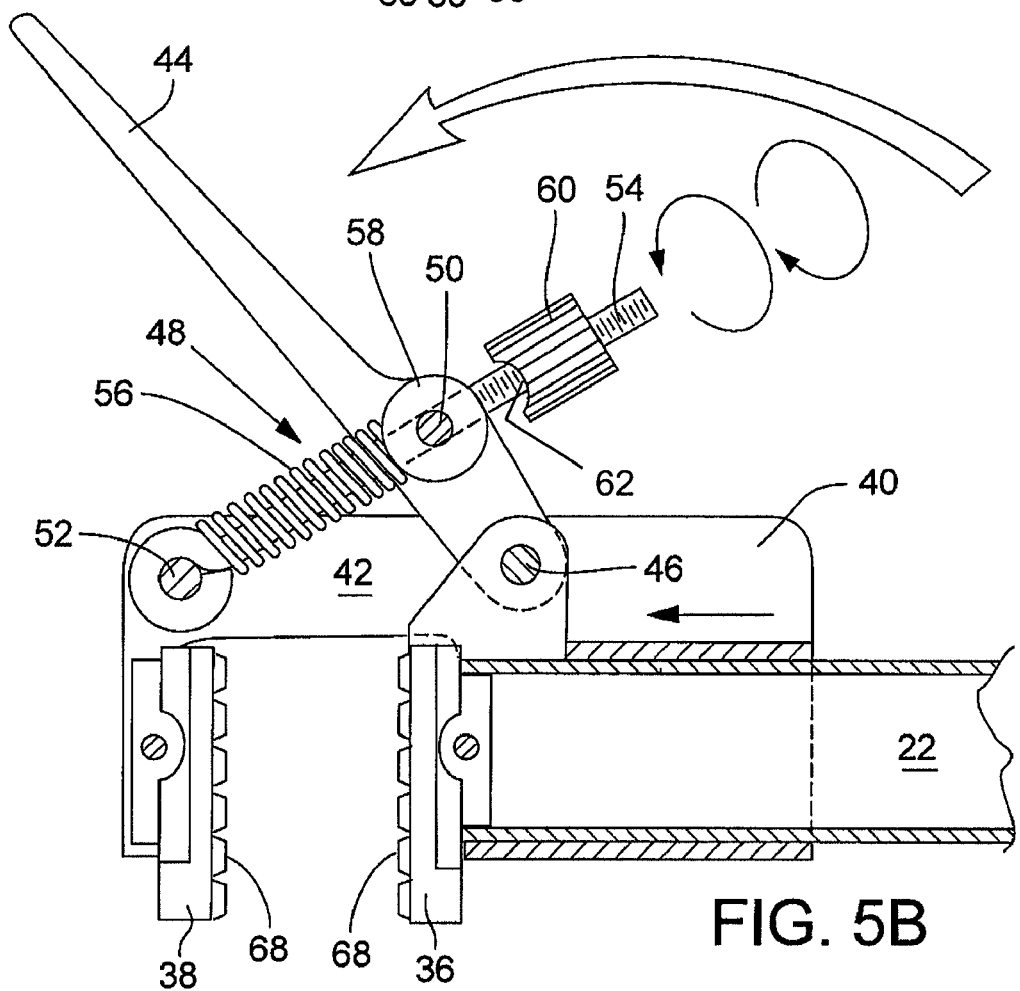

Reference is made to FIGS. 5A, 5B which more clearly illustrate the adjustment features. It will be noted that the pull rod 48 includes a threaded bolt 54 that is attached at one end to pivot 52. A coil spring 56 surrounds the bolt between pivot 52 and a hub 58 of the lever 44. The spring abuts the hub 58 whereas the bolt passes freely through the hub. A formed nut 60 is threaded onto the bolt 54 and a formed inset/concavity 62 at the inner side of the nut 60 engages the hub 58 (the spring 48 urging the hub 58 and lever 44 toward the inset). While in the engaged position, the nut 60 will not readily turn relative to the bolt 54 which defines the open and closed positions of the outer jaw 38. The open and closed positions can be increased or decreased by manually pushing the lever outward against the spring 48 to unseat the hub 58 from inset 62 (as shown in FIG. 5B), thus allowing turning of the nut 60 relative to the threaded bolt 54 to thereby move the nut 60 outward or inward as desired for opening or closing the distance between the jaws 36, 38.

It will be appreciated that the stabilizing bar can be extended the distance between the side rails 18 and with the lever 44 in the open position, the jaws of the end clamp positioned at opposing sides of the side rails. As will be observed from the FIGS. 3 and 4, the engagement faces of the jaws are provided with an elastamer pad 68 having a configured outer face i.e., forming nodules. As the lever 44 is pivoted towards the closed position, the outer faces of the jaws engage the opposing sides of the rail. It is desirable that such engagement occurs before the lever is fully closed whereby the fully closed position requires compression of the elastimor pad for enhanced gripping. Should the fully closed position be too loose or too tight, the lever can be opened to a position where the spring 48 is further compressed and the hub 58 is unseated from the inset 62 of nut 60, thus allowing inner or outer adjustment of the nut.

Reference is now made to FIG. 2 which illustrates a latch mechanism to prevent disassembly of the bar so as to prevent inadvertent disassembly of the bar or tube length during telescopic extension of the bar. A latch mechanism 64 inside the small tube 26 at the inner end of the tube 26 extends through slot 66. This latch 64 seats in retaining hole 68 in the end of middle tube 24 when these tube lengths are fully extended. Further extension is then possible only by relative telescoping movement between tubes 22 and 24 where a further latch mechanism (not shown) prevents these components from being over extended. The latch mechanism can be readily released manually or as desired by forcing a collapsed movement as between the two.

The embodiment herein disclosed is intended to illustrate the preferred embodiment of the invention but which encompasses numerous alternative design features which will be apparent to those skilled in the art. It is intended that the appended claim encompass such alternative design features and accordingly the claim terms are to be given their broad interpretation consistent with this intention.

The invention claimed is:

1. A device for stabilizing a segmented cargo load on a cargo bed having side rails extending along sides of the cargo bed, the side rails having exposed upper edges, the device comprising;
   a first stabilizing bar having multiple telescoping bar sections extendable to span the width of the cargo bed between the side rails, said first stabilizing bar having an exposed upper edge, wherein said multiple telescoping bar sections of said first stabilizing bar comprise a fully collapsed length no greater than half of a fully extended length of said first stabilizing bar; and
   end clamps provided on opposing ends of said first stabilizing bar, wherein said end clamps are configured to clamp over and onto the exposed upper edges of the side rails of the cargo bed and over and onto an exposed upper edge of one or more additional stabilizing bars, wherein each of the one or more additional stabilizing bars has multiple extendable telescoping bar sections, and whereby said first stabilizing bar is configured to cooperate with the one or more additional stabilizing bars for securing segmented cargo loads in both width wise and length wise directions relative to the cargo bed.

2. The device of claim 1, wherein said end clamps each include an inner jaw fixedly mounted to an end of said first stabilizing bar and an outer jaw slideably mounted on said end of said first stabilizing bar, wherein said outer jaw is movable relative to said inner jaw by operation of an actuating mechanism.

3. The device of claim 2, wherein said actuating mechanism includes a pull rod having a proximal end pivotally mounted to said outer jaw and a lever pivotally mounted relative to said inner jaw.

4. The device of claim 3, further comprising a hub portion forming a part of said lever at a position spaced from the pivotable mounting of the lever relative to the inner jaw, said pull rod extending through the hub portion.

5. The device of claim 4, wherein a distal end portion of the pull rod is threaded, and further comprising a nut threadably mounted on the distal end portion of the pull rod and abutting the hub portion to prevent slideable movement of the pull rod through the hub.

6. The device of claim 5, wherein said nut is threadably adjustable along the threaded distal end portion of the pull rod for selectively determining a point of abutment and thereby a degree of movement of the outer jaw toward the inner jaw.

7. The device of claim 5, wherein the nut and hub portion are cooperatively configured to provide seating of the hub with the nut and thereby inhibiting threadable movement of the nut while in abutment with the hub.

8. The device of claim 5, further comprising a spring member between the outer jaw and the lever for urging the lever into abutment with the nut.

9. A system for stabilizing a segmented cargo load on a cargo bed having side rails extending along sides of the cargo bed, the side rails having exposed upper edges, the system comprising;
- a plurality of stabilizing bars each having an exposed upper edge and each having multiple telescoping bar sections extendable to span the width of the cargo bed between the side rails, or to span the width between a side rail and another stabilizing bar of the plurality of stabilizing bars, or to span a width between two other stabilizing bars of said plurality of stabilizing bars, wherein said multiple telescoping bar sections of each of said plurality of stabilizing bars comprise a fully collapsed length no greater than half of a fully extended length of each of said plurality of stabilizing bars; and
- end clamps provided on opposing ends of each of said plurality of stabilizing bars, wherein said end clamps are configured to clamp over and onto the exposed upper edges of the side rails of the cargo bed and over and onto the exposed upper edges of the plurality of stabilizing bars whereby said plurality of stabilizing bars are configured to be secured to the side rails and to other stabilizing bars of said plurality of stabilizing bars or between other stabilizing bars of said plurality of stabilizing bars for securing segmented cargo loads in both width wise and length wise directions relative to the cargo bed.

10. The system of claim 9, wherein the fully collapsed length is approximately 4 feet.

11. The system of claim 9, wherein said end clamps each include an inner jaw fixedly mounted to an end of stabilizing bar of said plurality of stabilizing bars and an outer jaw slideably mounted on said end of said stabilizing bar of said plurality of stabilizing bars, wherein said outer jaw is movable relative to said inner jaw by operation of an actuating mechanism.

12. The system of claim 11, wherein said actuating mechanism includes a pull rod having a proximal end pivotally mounted to said outer jaw and a lever pivotally mounted relative to said inner jaw.

13. The system of claim 12, further comprising a hub portion forming a part of said lever at a position spaced from the pivotable mounting of the lever relative to the inner jaw, said pull rod extending through the hub portion.

14. The system of claim 13, wherein a distal end portion of the pull rod is threaded, and further comprising a nut threadably mounted on the distal end portion of the pull rod and abutting the hub portion to prevent slideable movement of the pull rod through the hub.

15. The system of claim 14, wherein said nut is threadably adjustable along the threaded distal end portion of the pull rod for selectively determining a point of abutment and thereby a degree of movement of the outer jaw toward the inner jaw.

16. The system of claim 15, wherein the nut and hub portion are cooperatively configured to provide seating of the hub with the nut and thereby inhibiting threadable movement of the nut while in abutment with the hub.

17. The system of claim 14, further comprising a spring member between the outer jaw and the lever for urging the lever into abutment with the nut.

18. The device of claim 1, wherein the fully collapsed length is approximately 4 feet.

* * * * *